July 5, 1932. A. KINDELMANN ET AL 1,866,112
SPROCKET FASTENING
Filed Oct. 31, 1929    2 Sheets-Sheet 1

INVENTORS
Albert Kindelmann
Ewald Boecking
BY
Howard W. Dix
ATTORNEY

July 5, 1932.　　A. KINDELMANN ET AL　　1,866,112
SPROCKET FASTENING
Filed Oct. 31, 1929　　2 Sheets-Sheet 2

INVENTORS
Albert Kindelmann
Ewald Boecking
BY
ATTORNEY

Patented July 5, 1932

1,866,112

UNITED STATES PATENT OFFICE

ALBERT KINDELMANN, OF FLORAL PARK, AND EWALD BOECKING, OF BROOKLYN, NEW YORK, ASSIGNORS TO INTERNATIONAL PROJECTOR CORPORATION, OF NEW YORK, N. Y., A CORPORATION OF DELAWARE

SPROCKET FASTENING

Application filed October 31, 1929. Serial No. 403,769.

This invention relates to fastening devices, and more particularly to a means for fastening an operating mechanism to a rotating shaft.

The invention is particularly applicable to a means for fastening a sprocket or fly-wheel to a rotating shaft in a motion picture projection apparatus and will be described with particular reference thereto. It is capable of various other uses, however, as will be apparent to those skilled in the art.

An object of the invention is to provide a simple and efficient locking means for securing a member to a rotating shaft.

Another object is to provide a positive lock for securing a member such as a pulley, fly-wheel or sprocket to a shaft.

A further object is to provide a locking mechanism by which the above elements may be positively secured.

Other and further objects will be apparent as the nature of the invention is disclosed.

A feature of the invention is a frictional device carried by the shaft and adapted to be expanded into engagement with the hub of the member to be secured thereto.

Another feature is an expanding key carried by the shaft and adapted to be brought into frictional engagement with the internal surfaces of a hub member.

The invention also consists in certain new and original features of construction and combinations of parts hereinafter set forth and claimed.

Although the novel features which are believed to be characteristic of this invention will be particularly pointed out in the claims appended hereto, the invention itself, as to its objects and advantages, the mode of its operation and the manner of its organization may be better understood by referring to the following description taken in connection with the accompanying drawings forming a part thereof, in which Fig. 1 is a sectional view of the fastening means of the present invention applied to a sprocket;

Like reference characters denote like parts in the several figures of the drawings.

In the following description and in the claims parts will be identified by specific names for convenience, but they are intended to be as generic in their application to similar parts as the art will permit.

Figure 1:
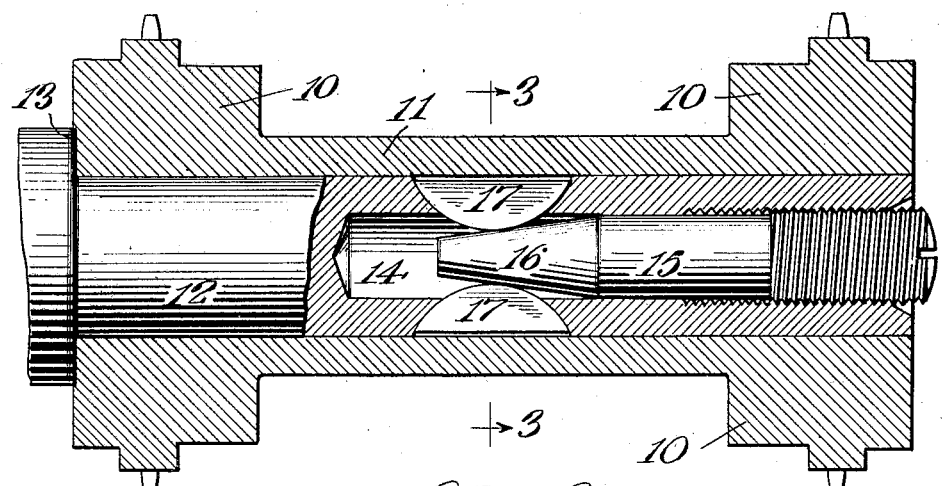

Referring to the drawings more in detail the invention is shown in Fig. 1 as applied to a sprocket 10 having a hub member 11 by which it is secured to shaft 12. Said sprocket may be positioned against a shoulder 13 of said shaft if desired. Shaft 12 is provided with an interior bore 14 in which a member 15 having a tapered surface 16 is threaded. Said shaft is also provided with a pair of slots in which a pair of keys 17 are seated in engagement with surface 16.

Figure 2:
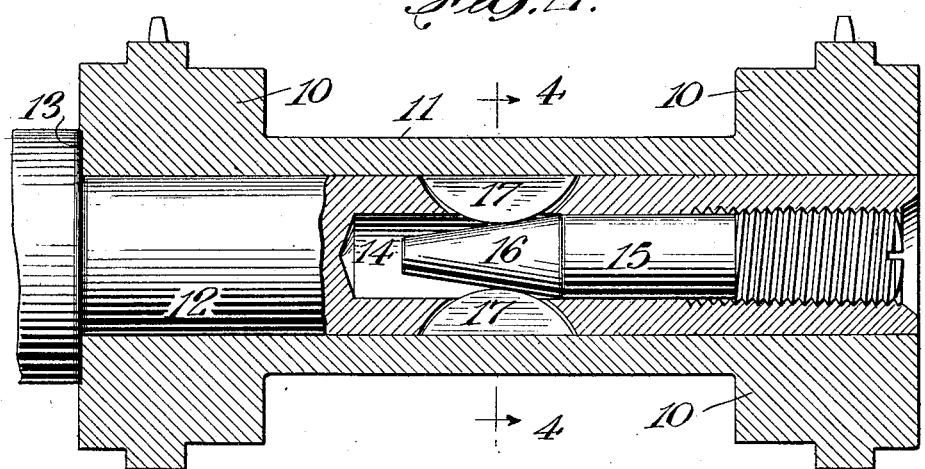
Fig. 2 is a sectional view similar to Fig. 1 showing the keys in engaging relationship.
Figure 3:
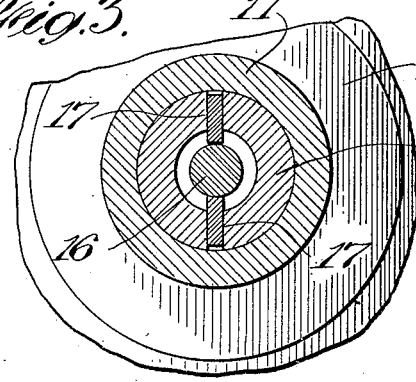
Fig. 3 is a section taken on the line 3—3 of Fig. 1.
Figure 4:
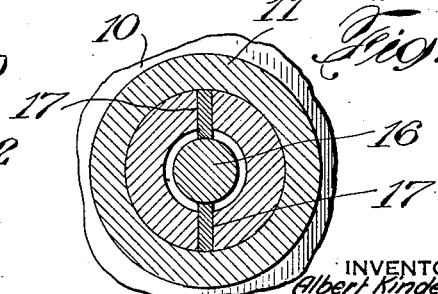
Fig. 4 is a section taken on the line 4—4 of Fig. 2.

Longitudinal movement of member 15 causes tapered surface 16 to exert a wedging force on keys 17 and thereby bring them into engagement with the inner surface of hub 11 as shown in Fig. 2. The frictional force is determined by the extent of movement of threaded member 15 which may be suitably adjusted to positively lock the sprocket 10 against movement with respect to shaft 12.

To secure the efficient operation of this device it is preferable to provide hub 11 with a bore of suitable size to form a comparatively tight fit on shaft 12. The additional force then obtained by the keys 17 may be used for positively locking the elements in position.

Figure 5:
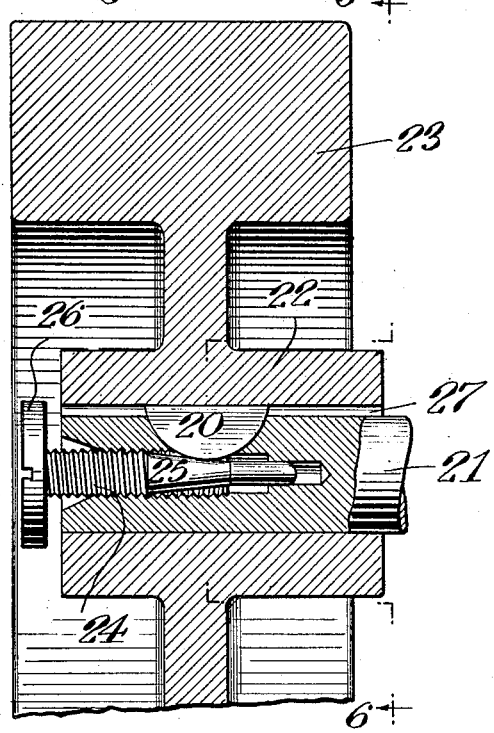
Fig. 5 is a sectional view of a modified form of the invention applied to a fly-wheel.
Figure 6:
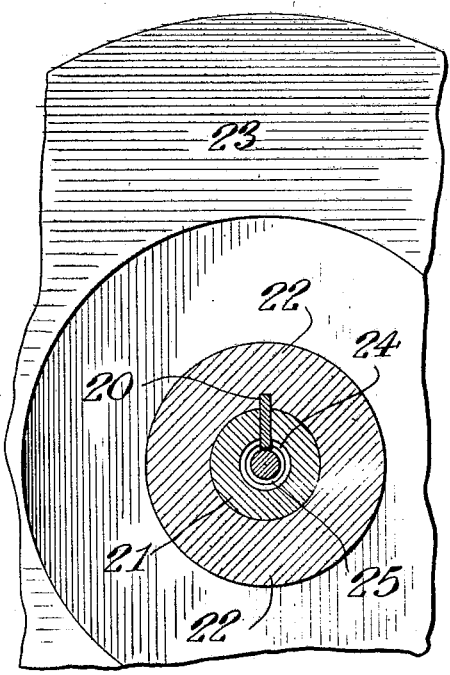
Fig. 6 is a section taken on the line 6—6 of Fig. 5.

The invention is shown in Fig. 5 as applied to a device for locking a fly-wheel onto the shaft and comprises a key 20 which is carried on shaft 21 and is brought into engagement with the hub 22 of fly-wheel 23 by a threaded member 24 having a tapered cam surface 25. Member 24 is threaded in a suitable bore in shaft 21 and may be provided with a head 26 to facilitate adjustment thereof. Hub 22 is provided with a keyway 27 in which key 20 is adapted to seat for positively securing the parts against relative movement.

Figure 7:
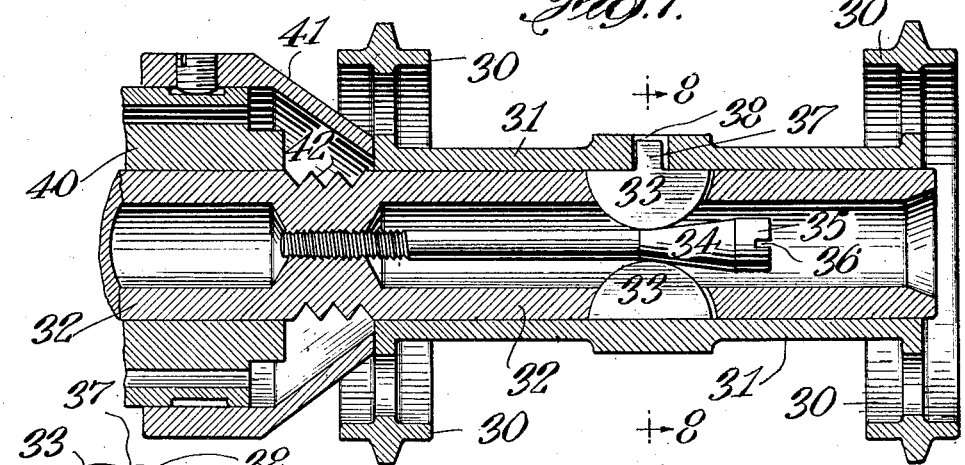
Fig. 7 is a sectional view of a modified form of the invention applied to a sprocket for a projection apparatus.
Figure 8:
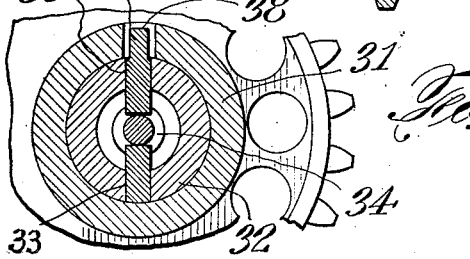
Fig. 8 is a section taken on the line 8—8 of Fig. 7.

The invention is shown in Fig. 7 as applied to a sprocket 30 for a projection apparatus. Said sprocket is provided with a hub member 31 which is in close engagement with the surface of shaft 32. The keys 33 are carried in said shaft in position to engage with the inner surface of hub 31 and in contact with tapered surface 34 of threaded member 35. Said member 35 is threaded internally of shaft 32 and is provided with a slot 36 to facilitate adjustment. Key 33 is provided with an extension 37 which seats in a groove 38 in hub member 31 for positively securing the members in position. Shaft 32 is journalled in a suitable bearing in housing 40 which carries an oil shield 41 terminating adjacent said sprocket. Oil threads 42 may be formed on said shaft for preventing creepage of oil along the surface thereof.

It is to be noted that the fastening device described above provides means for readily positioning and locking an element to a rotating shaft and contains no projecting parts which would interfere with the operation thereof. The expanded keys are capable of exerting sufficient frictional force on the hub member to prevent relative movement unless extreme forces are applied. In any event the keyway illustrated in Fig. 5 and the positioning extension illustrated in Fig. 7 form a positive lock.

While certain novel features of the invention have been shown and described and are pointed out in the annexed claims, it will be understood that various omissions, substitutions and changes in the forms and details of the device illustrated and in its operation may be made by those skilled in the art without departing from the spirit of the invention.

What is claimed is:

1. In combination with a sprocket, a shaft, said sprocket having a hub in engagement with said shaft, a key carried by said shaft and adapted to contact with said hub, said key having a positioning extension adapted to seat in a recess in said hub, and a tapered member carried internally of said shaft for bringing said key into frictional engagement with said hub.

2. In combination with a sprocket, a shaft, said sprocket having a hub in engagement with said shaft, a key carried by said shaft and having a positioning extension adapted to seat in a recess in said hub and having a surface adapted to contact with the inner surface of said hub, and an adjustable threaded member carried internally of said shaft for maintaining said key in frictional engagement with said hub.

ALBERT KINDELMANN.
EWALD BOECKING.